US007664521B2

(12) United States Patent
Arimitsu

(10) Patent No.: US 7,664,521 B2
(45) Date of Patent: Feb. 16, 2010

(54) TARGET VALUE CONTROL SYSTEM FOR TRANSMISSION POWER CONTROL AND METHOD THEREOF AND BASE STATION AND MOBILE COMMUNICATION TERMINAL

(75) Inventor: Kazuhiro Arimitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 11/059,822

(22) Filed: Feb. 17, 2005

(65) Prior Publication Data

US 2005/0197151 A1 Sep. 8, 2005

(30) Foreign Application Priority Data

Feb. 19, 2004 (JP) ............................. 2004-043232

(51) Int. Cl.
*H04B 7/00* (2006.01)
(52) U.S. Cl. ...................... 455/522; 455/69; 455/115.1; 455/115.3; 455/442; 375/358; 375/76
(58) Field of Classification Search ................. 455/522, 455/69, 115.1, 115.3, 442
See application file for complete search history.

(56) References Cited

U.S. PATENT DOCUMENTS

| 6,088,573 | A | 7/2000 | Tsuda | |
|---|---|---|---|---|
| 6,904,291 | B2 * | 6/2005 | Miyamoto et al. | 455/522 |
| 7,187,942 | B2 * | 3/2007 | Hosokawa | 455/522 |
| 2001/0019962 | A1 * | 9/2001 | Goto | 455/522 |
| 2002/0016177 | A1 * | 2/2002 | Miya et al. | 455/522 |
| 2002/0131449 | A1 * | 9/2002 | Sugisaki | 370/465 |
| 2003/0003942 | A1 * | 1/2003 | Okumura | 455/522 |
| 2004/0162100 | A1 * | 8/2004 | Moon et al. | 455/522 |
| 2004/0248608 | A1 * | 12/2004 | Kobayashi | 455/522 |

FOREIGN PATENT DOCUMENTS

| CN | 1102308 C | 2/2003 |
|---|---|---|
| EP | 0 853 393 A1 | 7/1998 |
| JP | 8-181653 | 7/1996 |

(Continued)

*Primary Examiner*—Matthew D Anderson
*Assistant Examiner*—Adel Youssef
(74) *Attorney, Agent, or Firm*—Scully, Scott, Murphy & Presser, P.C.

(57) ABSTRACT

In the mobile communication system, a total reception quality between a terminal and a base station is converged into a target quality, thereby suppressing a period in which the transmission power of a distant station becomes excessive.

In a mobile communication terminal, when a target SIR for the transmission power control in a down link from a radio base station is controlled, when a transmission power control system using a moving average is adopted, an error occurrence situation is detected by a reception quality calculating unit, and when many errors occur in the short time in the shadow of a building and the like, the number of errors is replaced with a predetermined upper limit value, and the reception quality of the moving average is calculated by an up/down adjusting unit, and when this calculating result is better than a target reception quality, the going down timing and down width of the target SIR are changed, and the target SIR at that time is decided and controlled by a target SIR deciding unit. In this way, the period in which the transmission power of the radio station becomes excessive can be suppressed.

19 Claims, 8 Drawing Sheets

FOREIGN PATENT DOCUMENTS

| | | |
|---|---|---|
| JP | 10-336088 | 12/1998 |
| JP | 2003-143071 | 5/2003 |
| JP | 2003-244070 | 8/2003 |
| WO | WO97/50197 | 12/1997 |
| WO | WO01/22756 A1 | 3/2001 |
| WO | WO 03/055098 A1 | 7/2003 |

* cited by examiner

TARGET VALUE CONTROL SYSTEM FOR TRANSMISSION POWER CONTROL AND METHOD THEREOF AND BASE STATION AND MOBILE COMMUNICATION TERMINAL

BACKGROUND OF THE INVENTION

1. Field of the Invention

The present invention relates to a target value control system for a transmission power control and a method thereof and a base station and a mobile communication terminal, and in particular, it relates to a target value control system for a transmission power control in a W-CDMA communication system.

2. Description of the Related Art

In general, in a portable type mobile station and a radio base station (hereinafter simply referred to as base station) of a W-CDMA (Wideband-Code Division Multiple Access) communication system, a transmission power control function for controlling transmission powers of respective distant stations is built. This is a function to control the transmission power of the distant station so that a reception quality satisfies a target reception quality in a local station. Here, the target reception quality is set for a mobile station and a base station from a network. For these transmission power controls, there have been several proposals submitted.

For example, in Patent Document 1, there has been proposed the operation of a basic transmission power control. To be more specific, when the current reception quality does not satisfy the target reception quality, a target SIR (Signal to Interference Ratio) is increased, and when the target reception quality is satisfied, the target SIR is decreased. By comparing the adjusted target SIR to a reception SIR, a TPC (Transmission Power Control) bit for controlling the transmission power of the distant station is decided, thereby controlling the transmission power of the distant station.

In this Patent Document 1, as a technique for enhancing measurement accuracy of the reception quality, there is an attempt made to satisfy the target reception quality by finding a moving average of the number of reception errors (corresponding to the reception quality) in a certain constant section.

[Patent Document 1] Republication of PCT Application No. WO 97-50197

SUMMARY OF THE INVENTION

As described above, the technology of the Patent Document 1 is a system where, by using a moving average of the number of reception errors in a certain constant period, a correction control of a target SIR is performed. However, this system is affected by an impact of great reception errors occurred in the past during a moving average period. This results in a problem that an excessive power is demanded from the distant station, thereby lowering a circuit capacity of the whole system.

Further, at the calculating time of the moving average, there is also a technique employed which takes into consideration of a weighting. That is, a so-called oblivion coefficient (referred to as a weighting technique where the older one is, the smaller in weight it is) is introduced so that the number of new reception errors is reflected more than the old reception errors, thereby calculating the moving average. According to this technique, though a tracking accuracy for the error of the calculated moving average is improved, when the reception quality of a long period is measured, there is a problem that the influence of the reception errors occurred in the past cannot be taken into consideration and the target reception quality is not satisfied.

Each of the above described problems will be specifically described by using FIGS. 7 and 8. The conventional technique of the moving average according to the Patent Document 1 calculates the reception quality for every block size to be measured (in FIG. 7, the block size is set to "125") and performs a comparison between the target SIR and the reception SIR. At this time, as described above, as a method of converging the reception quality into the target quality, a moving average processing is adopted (in FIG. 7, the number of moving averages is taken as 10). In this case, as the reception quality, since the block size is 125 and the number of moving averages is 10, the reception quality (BLER: Block Error Rate) in 1250 block sections is calculated. The quality by the moving average is shown by the quality for every moving average of FIG. 7.

A graph of an actual quality (quality in a total since when starting a connection) is shown as "Total Quality" of the figure. A target as the operation of the transmission power control is to converge this Total Quality into a target value, for example, 5% (0.05). Although the target value is different according to the type of a call, here, as an example, it is taken as 5%.

Here, though it can be easily presumed that the larger the number of moving averages is set, the closer it becomes to the "Total Quality", when the number of moving averages is set large, it results in the operation which continues to be affected by the influence of the errors occurred in the past during a long moving average section. For example, in the frames 17, 18 and 19 of FIG. 7, despite of the fact that the actual quality is far below 5% of the target from the frame 20, due to occurrence of a great many errors instantaneously occurred (occurred when entered inside the shadow of a building or a tunnel), the reception quality result during the moving average section is bad up to the frame 26, and it goes far below 5% only after from the frame 27, and therefore, the target SIR cannot be let go down until the frame 26, and a point of timing of starting going down is from the frame 27, and by that much, a delay occurs (heretofore, up until the reception quality result of the moving average section goes far below the target value, the target SIR cannot be let go down).

As a result, the section of the excessive reception quality continues up to the frame 31, and during this section, the excessive transmission power is demanded from the distant station, thereby wasting the power and unnecessarily interfering with near radio communication stations, and moreover, wasting radio resources.

Further, when the number of the moving averages is small and the method of the weighting by using the oblivion coefficient is used, as shown in FIG. 8, though the quality of the weighting is hard to be affected by the errors occurred at the frames 17, 18, and 19, since an error fluctuation is tracked for every frame, as a result, it is evident that the Total Quality is not satisfied. To be more specific, it is evident that the Total Quality exceeds 5% of the target quality at the frame 18 of FIG. 8, and after that, the target quality is not satisfied.

Here, an object of the present invention is to provide a target value control system for a transmission power control and a method thereof and a radio communication station, which can converge the Total Reception Quality into the target quality, and suppress a period in which the transmission power of the distant station becomes excessive.

The transmission power target value control system according to the present invention is to down-control the target value for the transmission power control in the radio communication line between radio communication stations by a predetermined cycle and by a predetermined width when the reception quality of the moving average becomes better than the predetermined reception quality, wherein, when the number of error occurrences of received signals is larger than a predetermined threshold value, the system includes control means for controlling at least a going down period of the target value to be shorter than the predetermined cycle.

The transmission power target value control method according to the present invention is to down-control the target value for the transmission power control in the radio communication line between radio communication stations by a predetermined cycle and by a predetermined width when the reception quality of the moving average becomes better than the predetermined reception quality, wherein, when the number of error occurrences of received signals is larger than a predetermined threshold value, the method includes a control step of controlling at least a going down period of the target value to be shorter than the predetermined cycle.

The base station according the present invention is to down-control the target value for the transmission power control in the radio communication line with mobile communication terminals by a predetermined cycle and by a predetermined width when the reception quality of the moving average becomes better than the predetermined reception quality, wherein, when the number of error occurrences of received signals is larger than a predetermined threshold value, the base station includes control means for controlling at least a going down period of the target value to be shorter than the predetermined cycle.

The mobile communication terminal according to the present invention is to down-control the target value for the transmission power control in the radio communication line with base stations by a predetermined cycle and by a predetermined width when the reception quality of the moving average becomes better than the predetermined reception quality, wherein, when the number of error occurrences of received signals is larger than a predetermined threshold value, the terminal includes control means for controlling at least a lowering period of the target value to be shorter than the predetermined cycle.

A program according to the present invention is a program allowing a computer to execute a transmission power target value control method to down-control the target value for the transmission power control in the radio communication line between radio communication stations by a predetermined cycle and by a predetermined width when the reception quality of the moving average becomes better than the predetermined reception quality, wherein, when the number of error occurrences of received signals is larger than a predetermined threshold value, the program includes a processing of controlling at least a going down period of the target value to be shorter than the predetermined cycle.

The operation of the present invention will be described. When the target SIR for the transmission power control in the radio communication line between the mobile communication terminal and the radio base station is controlled and the transmission power control system using the moving average is adopted, when an error occurring situation is detected, and a great many errors occur in a short time in the shadow of a building and the like, if that number of errors is replaced by a predetermined upper limit value so as to calculate the reception quality of the moving average and this calculation result is better than the target reception quality, the going down timing and down width of the target SIR are changed, and the target SIR at that time is decided and controlled. In this way, the period in which the transmission power of the radio base station becomes excessive can be suppressed.

DETAILED DESCRIPTION OF THE PREFERRED EMBODIMENTS

Figure 1:
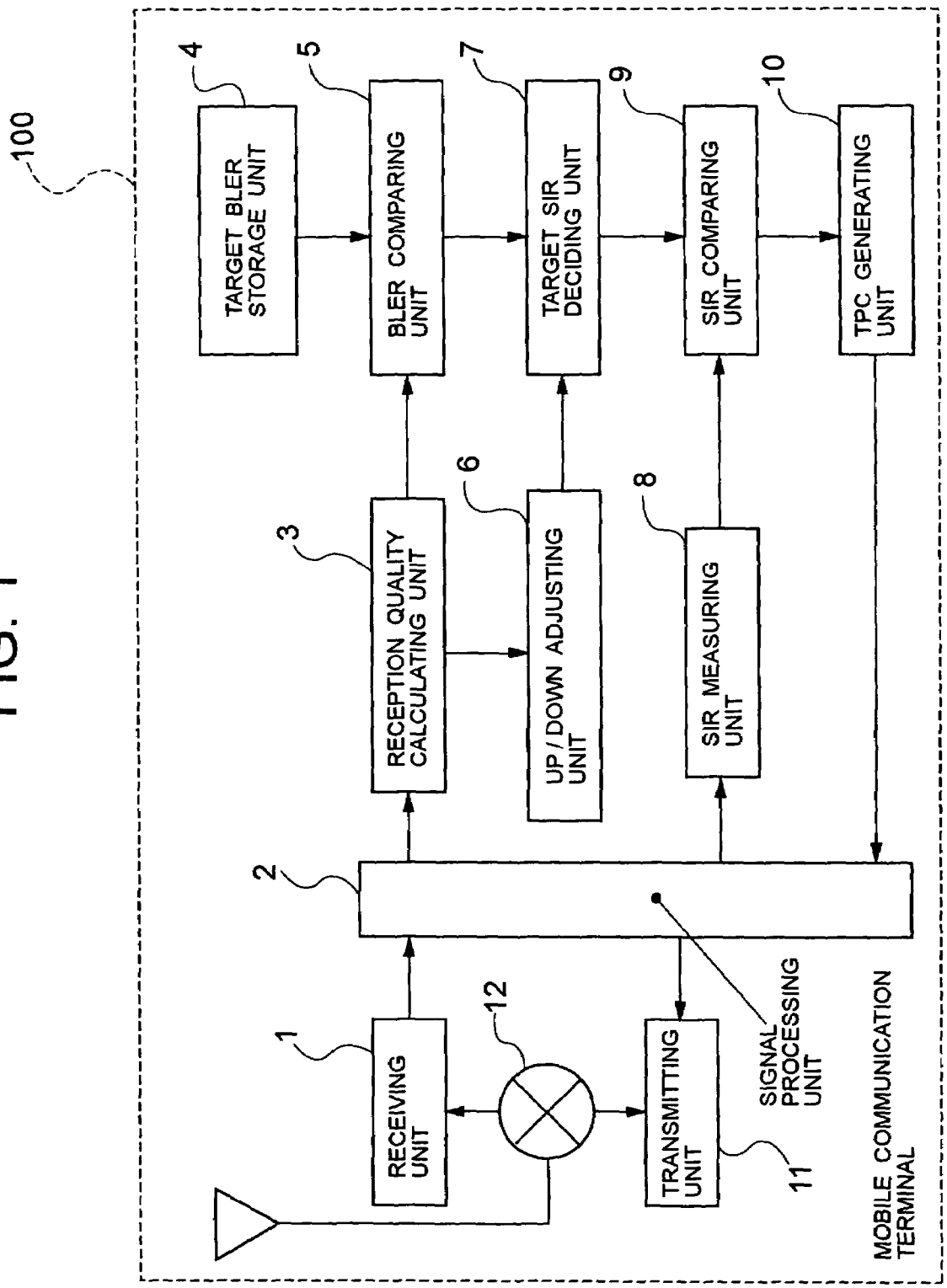
FIG. 1 is a functional block diagram of a mobile communication terminal of an embodiment of the present invention.

An embodiment of the present invention will be described below with reference to the drawings. Referring to FIG. 1, there is shown a functional block diagram of a mobile communication terminal 100 which is a mobile station according to the embodiment of the present invention. In FIG. 1, a spread signal transmitted from a base station (not shown) which is a distant station is received at a receiving unit 1 through an antenna and an isolator 12. The received signal is down-converted at the receiving unit 1, and is converted into A/D (analogue/digital). The received signal which is converted into a digital signal by this A/D conversion is subjected to a decode processing at a signal processing unit 2. In the signal processing unit 2, there is included a decoding unit, in which an error of the received signal is detected. Based on this error, in a reception quality calculating unit 3, a BLER showing a reception quality by a moving average, the number of errors and the like are calculated.

In a target BLER value storage unit 4, a target BLER value designated in advance for every call type (generally, when of a speech communication, a quality of 0.5% is required, and when of a packet communication, a quality of 5% is required) is stored, and the target BLER value and a reception BLER value calculated at the reception quality calculating unit 3 are compared at a comparing unit 5, and according to this comparing result, a target SIR is decided by a target SIR deciding unit 7. At this time, based on the number of errors which is a reception quality, a timing which changes the target SIR and an adjusting width which adjusts the target SIR are decided at an UP/Down (going up and going down) adjusting unit 6. Based on the changed timing and the adjusted width decided at this adjusting unit 6, the adjustment of the target SIR at the target SIR deciding unit 7 is executed.

The SIR decided at the target SIR deciding unit 7 and the reception SIR measured at a SIR measuring unit 8 are compared at a SIR comparing unit 9. Based on this comparison result, in a TPC generating unit 10, when the reception SIR is worse than the target SIR, a TPC bit for increasing the transmission power of the base station is generated, and when the reception SIR becomes better than the target SIR, a TPC bit for decreasing the transmission power of the base station is generated. The TPC bit generated at the TPC generating unit 10 is encoded together with the data transmitted by the signal processing unit 2, and is subjected to the D/A conversion, and after that, it is outputted at a transmitting unit 11. At the transmitting unit 11, the TPC bit is subjected to a frequency conversion, and is transmitted to the base station through the isolator 12 and the antenna.

Figure 2:
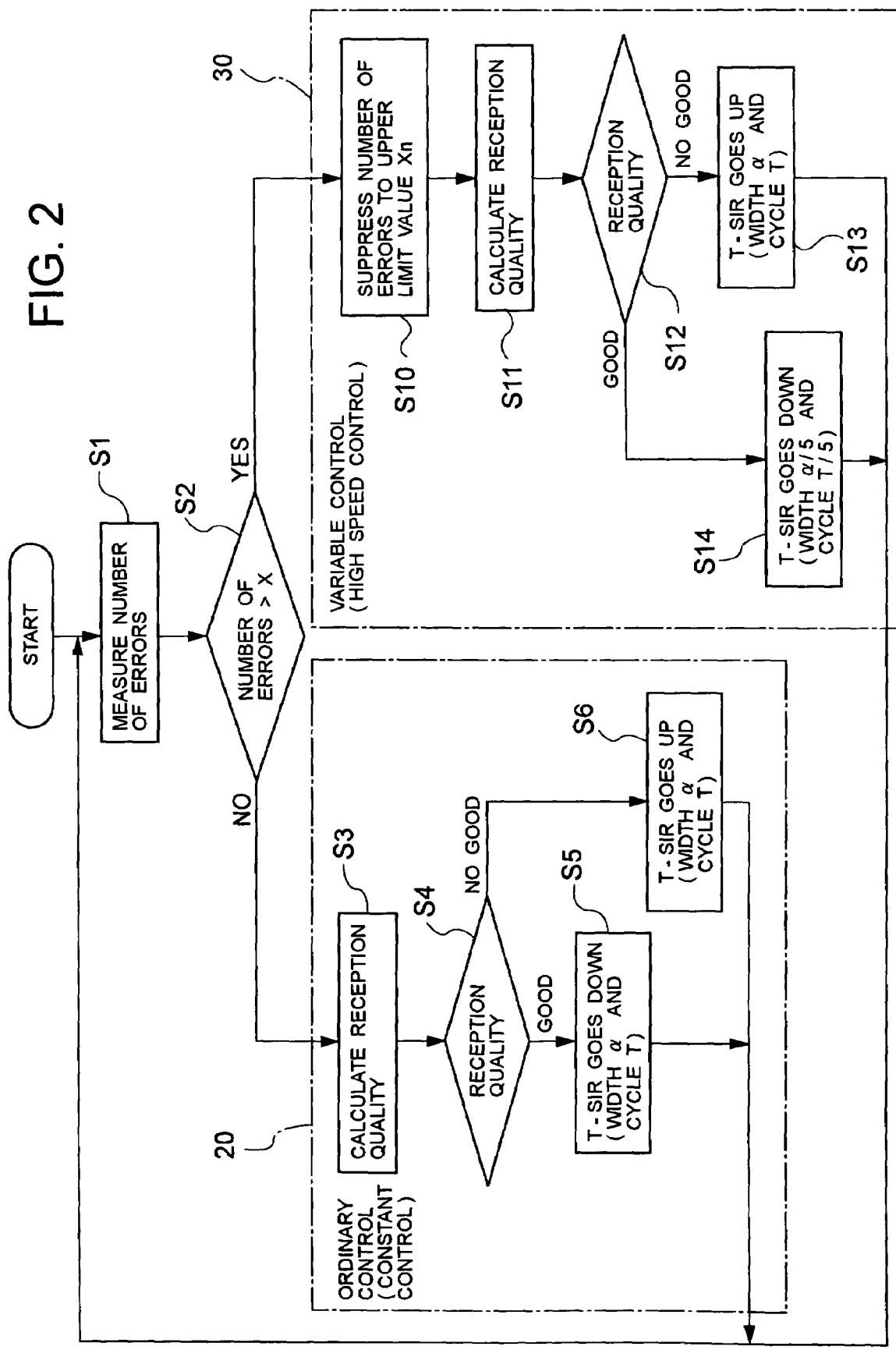
FIG. 2 is a flowchart showing the operation in one embodiment of the present invention.

Next, the operation of the embodiment of the present invention will be described in detail. FIG. 2 is a flowchart showing the operation of the one embodiment of the present invention. The number of errors is detected in the reception quality calculating unit 3 (step S1). At this time, when the mobile station enters the shadow of a building, a tunnel and the like, and an extremely great many errors occur in a short period (see frames 17 to 19 of FIG. 7), this many errors occurrence state is detected so as to remove the influence of a short-term great many errors (step S2).

At this time, assuming that X is taken as a decision threshold value of the number of errors, this threshold value X is decides as follows. As described above, an increase of error adversely affecting the moving average should be detected, and further, the value is decided also in due consideration of the target reception quality (5%). That is, it is decided as the number of errors X=the target reception quality X m (m is a positive number), and for example, it is selected to X=100.

When the number of errors is below the threshold value X ("N" at step S2), the same ordinary control 20 of the SIR target as the conventional technology is performed, and in the case otherwise ("Y" at step 2), a variable control of the target SIR according to the present invention is performed.

Describing the ordinary control 20, the reception quality due to the moving average is calculated at the reception quality calculating unit 3 (step S3), and whether the target quality is good or bad is determined (step S4), and if it is, for example, below 5% which is the target quality, then the reception quality is good, and therefore, the target SIR (T-SIR) is down-controlled at a constant width α and at a constant cycle T (step S5). On the contrary, if the reception quality exceeds 5%, since the reception quality is bad, the target SIR (T-SIR) is up-controlled at a constant width α and at a constant cycle T (step S6). In this sense, the ordinary control 20 is referred to as a constant control.

Next, describing the variable control 30 of the present invention, first of all, the number of errors occurred is suppressed to a predetermined upper limit value Xn (step S10). This upper limit value Xn is decided from the moving average section and the target reception quality. When one section of the moving average section is taken as 100 and the target quality is 5%, it means five errors for one section and 5% of the target quality, and therefore, the upper limit value is set to three to four times (n times) the target number of errors which is five errors for every one section, for example, Xn=20. That is, Xn is set larger than an expected value (5) corresponding to the target quality, and moreover, below the value not adversely affected by the moving average.

The number of errors larger than X occurred in the short term is regarded as a constant value which is Xn=20 by step S10, and, that is, it is replaced by the constant value, and by using this constant value, the calculation of the reception quality by the moving average is performed at the reception quality calculating unit 3 (step S11). When the calculated reception quality is above the target quality (good at step S12), the down control of the T-SIR is performed by the UP/DOWN adjusting unit 6 (step S14). At this time, the down width (adjusted width) of the T-SIR is taken as below that (α) at step S5 in the ordinary control 20, and for example, it is taken as α/5, and at the same time, an adjusting timing (cycle) is also taken smaller than that (T) at step S5.

For example, it is taken as T/5. The operation at step S14 is continued for a predetermined constant period (not particularly illustrated). After that, the operation returns to step S1.

At step S14, since the reception quality has been below the target quality and has become a good quality, when the T-SIR is down-controlled quickly, the problem such as the waste of the power, the interference, and the like can be solved, and therefore, if only the adjusting timing (T) of the T-SIR is made small (quick), then, the object can be achieved. In that sense, this variable control is also referred to as a high-speed control. Further, the down width can be adjusted by the number of error occurrences.

In step S12, when the reception quality is worse than the target value (bad at step S12), the same control as step S6 of the ordinary control is performed (step S13). That is, the up width of the T-SIR is taken as α, and its up cycle is taken as T. The operation again returns to the number of errors measuring step S1.

Figure 3:
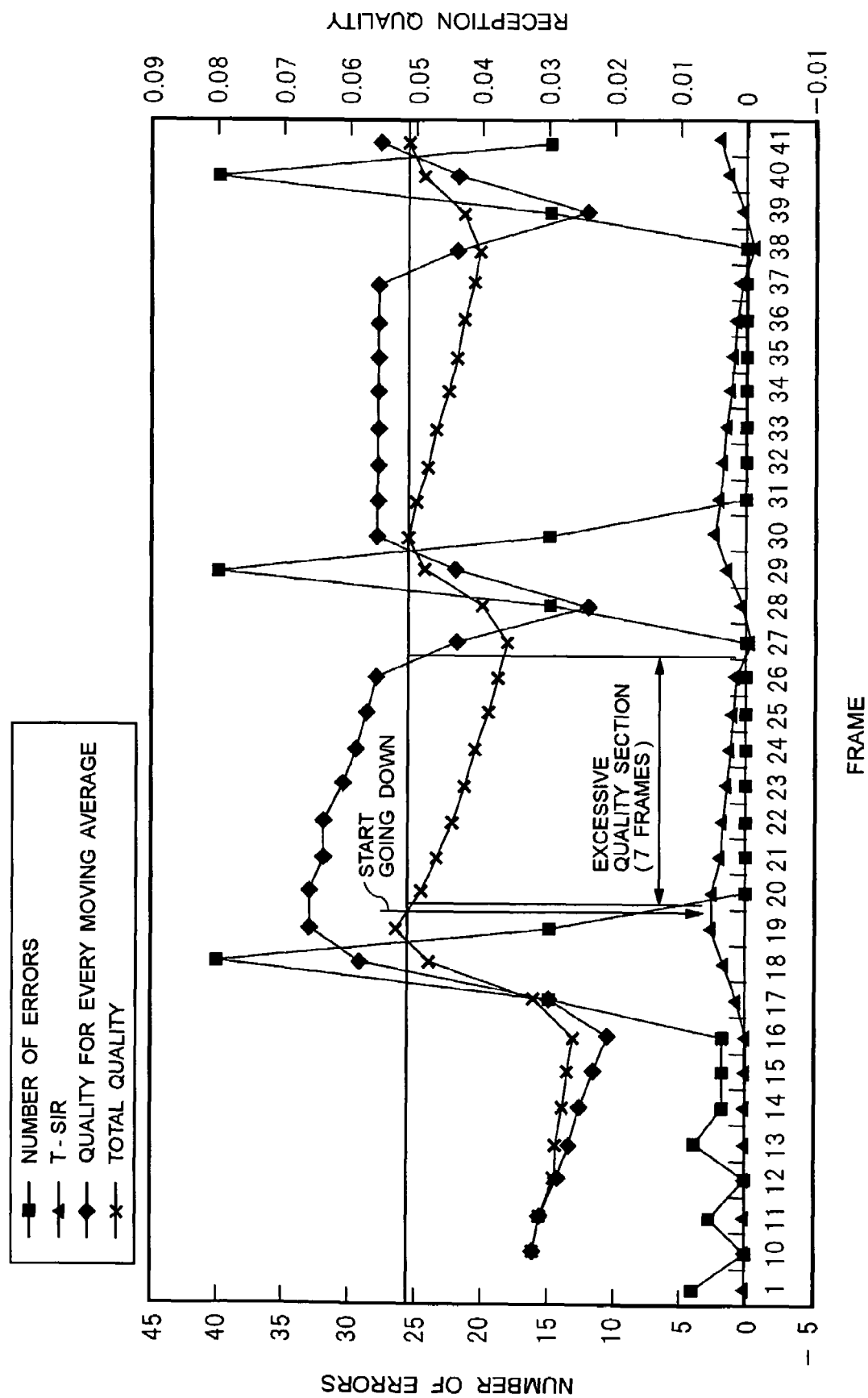
FIG. 3 is a view explaining an example of a transmission power control according to the embodiment of the present invention.

A characteristic example according to the T-SIR control method added with the above described variable control according to the present invention is shown in FIG. 3. FIG. 3 is a characteristic diagram showing the frames versus the number of errors and the reception quality under the same condition as FIG. 7, and is a diagram showing that the start of the going down of the T-SIR which is the advantage of the present invention can be made quicker than the conventional example of FIG. 7. With regard to the down width and the cycle of the T-SIR, however, the details are not shown to avoid a complicated drawing.

Figure 7:
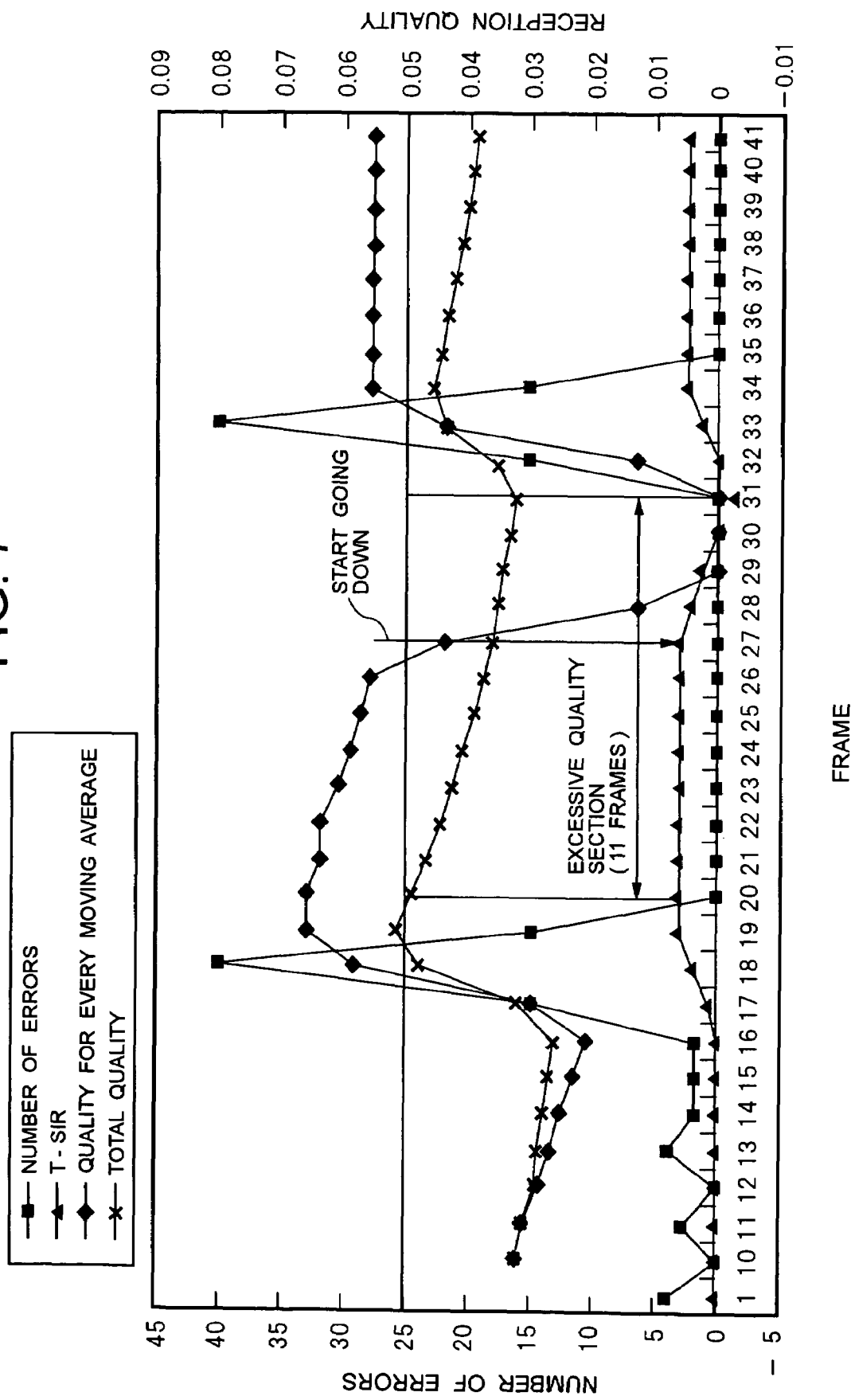
FIG. 7 is a view explaining one example of the transmission power control according to the conventional technology.
Figure 8:
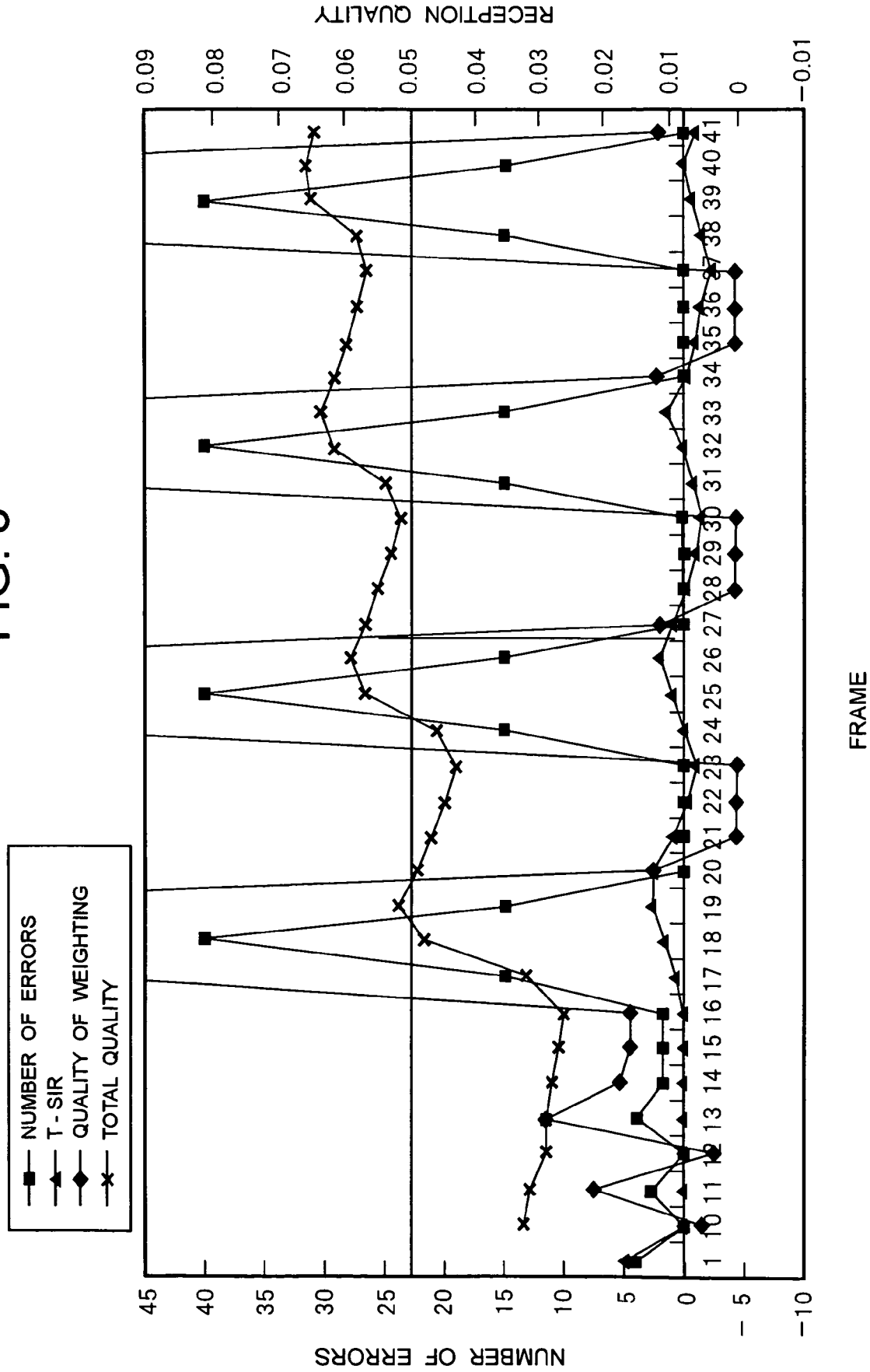
FIG. 8 is a view explaining another example of the transmission power control according to the conventional technology.

As described above, in general, when the moving average is used, since the T-SIR cannot be down-controlled until the quality of the moving average section satisfies the target quality, even when the number of errors increase in the short term, by being affected by its influence, the start of the going down of the T-SIR is delayed as shown in FIGS. 7 and 8. In contrast to this, in the present invention, when a great many errors occur in the short term, since the great many errors do not affect adversely the quality of the moving average section, the start of the going down of the T-SIR can be quickened.

That is, as shown in FIG. 3, according to the present invention, the T-SIR can be let go down from the frame 20, and further, by making the down cycle and width thereof large, the excessive quality section in the total quality can be reduced from 11 frames to 7 frames. Further, the excessive quality section of the moving average is reduced from 7 frames (section of the frames 27 to 33 of FIG. 7) to 3 frames (the frames 27 to 29 of FIG. 3), and it will be appreciated that the unevenness of the quality is controlled. Further, the total quality which is the final quality is converged into the target quality.

Particularly, according to the present invention, the going down start point of the T-SIR is the frame 20 as compared to the frame 27 of the conventional technique, and as a result, a timing of letting the transmission power of the base station go down is made much earlier. This can allow the section in which the excessive power is demanded from the base station to be reduced.

Figure 4:
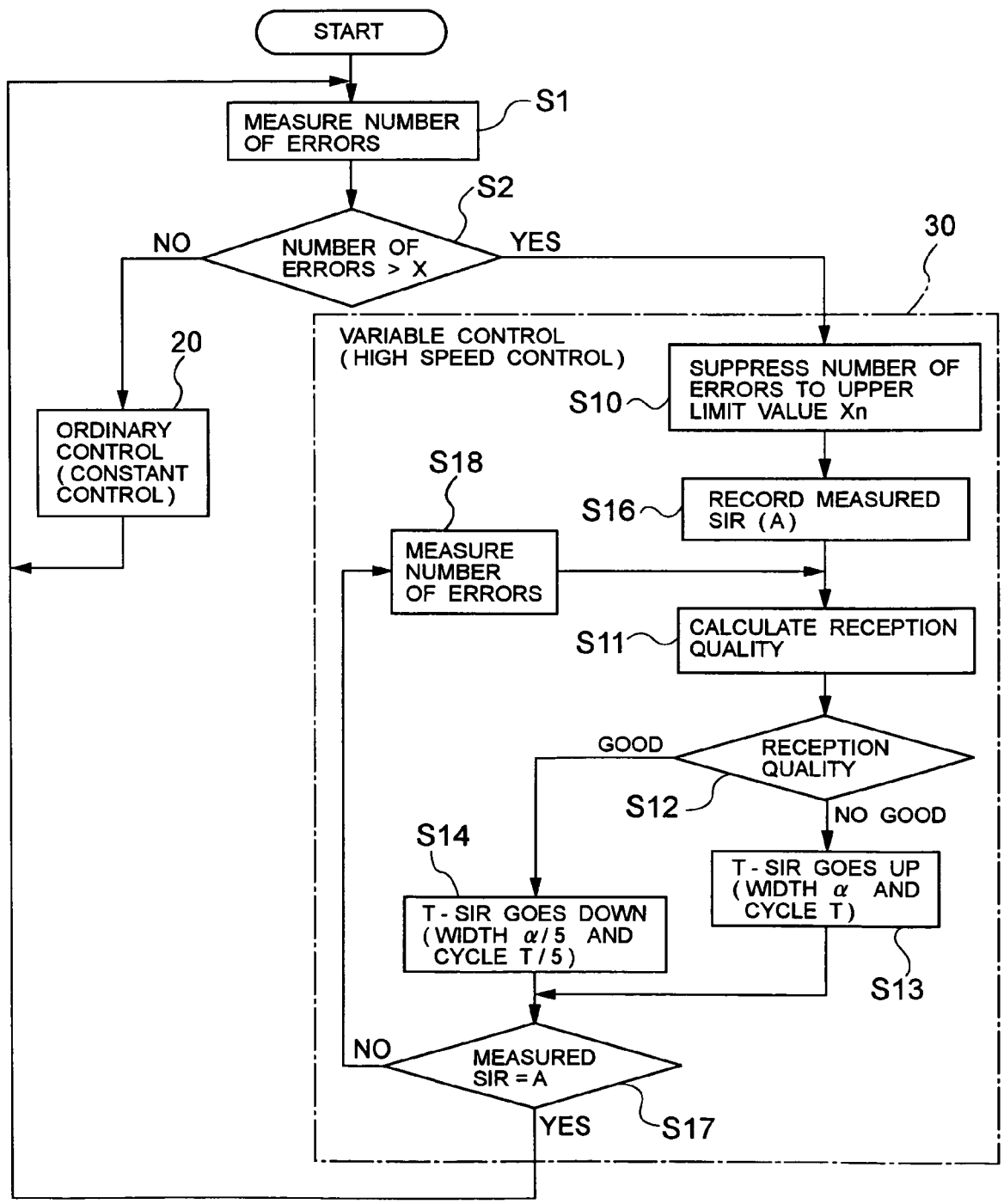
FIG. 4 is a flowchart showing the operation in another embodiment of the present invention.

FIG. 4 is a flowchart showing the operation of another embodiment of the present invention, and the same parts as those of FIG. 2 are shown by the same reference numerals. The functional block diagram thereof should be taken as the same as FIG. 1. In the present invention, when an error occurs which exceeds a certain constant X, since the T-SIR is put to the variable control 30, the measured SIR at that time is recorded, and as a result of having performed the variable control 30 according to the present invention, when the SIR becomes the SIR which has been recorded, the operation of this variable control 30 is completed, and it is restored to the ordinary control 20.

That is, as shown in FIG. 4, after step S10 in the variable control 30, step 16 for recording the measured SIR is provided, and when the number of errors becomes larger than the threshold value X, the SIR measured at the SIR measuring unit 8 of FIG. 1 is recorded in an unillustrated memory. When the measured SIR at this time is taken as A, as a result of performing the variable control of the present invention by steps S11 to S14, the operation of this variable control 30 is completed when the SIR reaches A in which the measured SIR is recorded ("Y" at step S17), and in the case of "N" at Step S17, the measurement of the number of errors is performed (step S18), and the operation returns to step S11, and continues this variable control 30 until the SIR becomes "Y" at step S17.

When the measured SIR reaches the measured SIR (=A) again at the time when an error occurs by exceeding X, similarly to the previous error occurrence, there is a possibility that an error occurs. This is because, between a reception level and an error occurrence, there exists a correlation, and in the case of the same reception level, it is known that the T-SIR has the same reception quality. Hence, the variable control 30 of the present invention is performed so as to drive the T-SIR and the measured SIR until the SIR becomes the measured SIR (=A) at the time of the error occurrence, and when the T-SIR reaches a value A driven in the past, it is returned to the ordinary control 20.

The measured SIR (=A) of the past is a trigger to change the control mode, and as for a SIR other than this measured SIR, it is considered to be returned to the ordinary control 10 when the reception quality thereof is satisfied.

Figure 5:
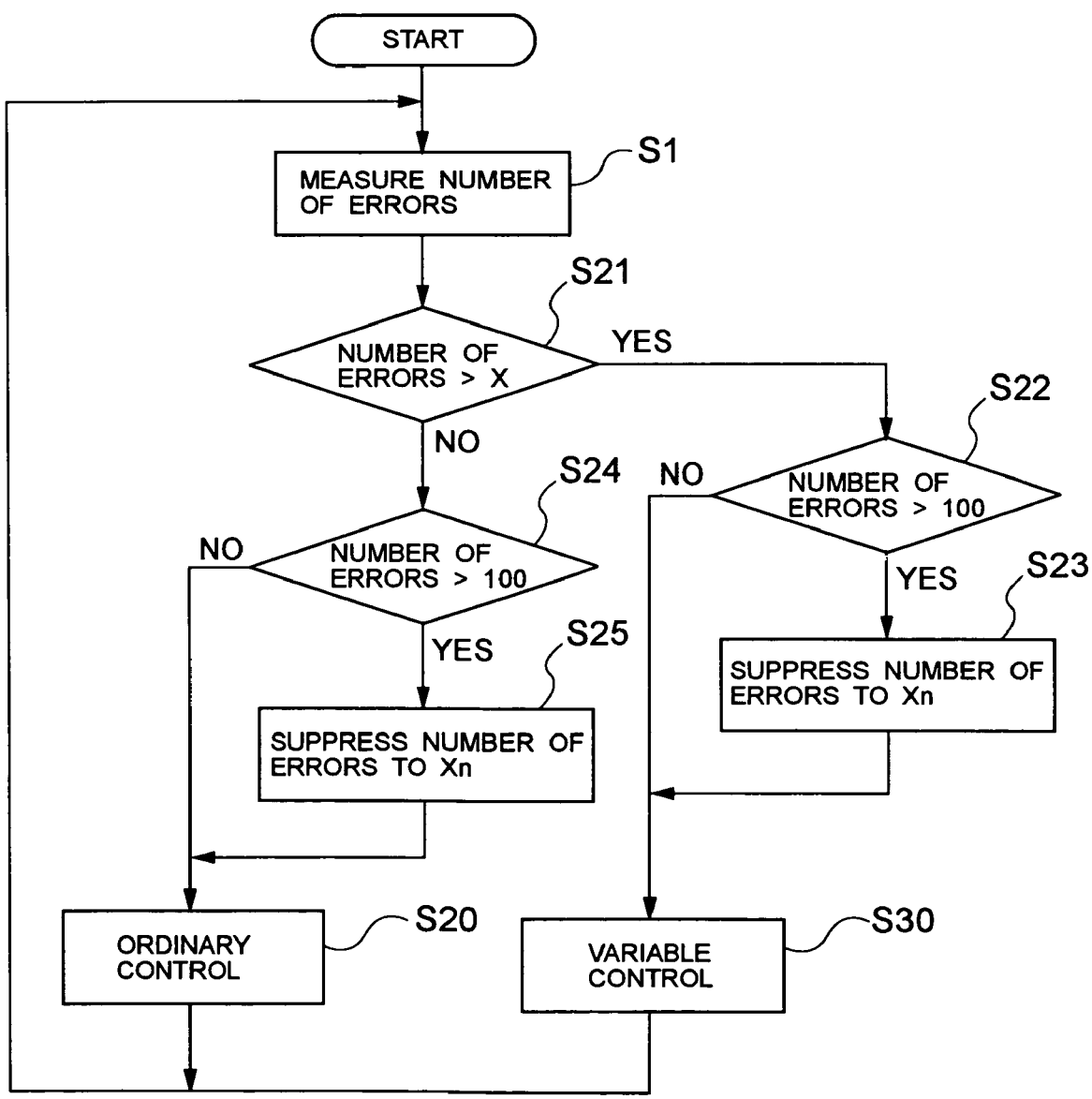
FIG. 5 is a flowchart showing the operation in still another embodiment of the present invention.

FIG. 5 is an operational flowchart showing still another embodiment of the present invention, and the same parts as those of FIGS. 2 and 4 are attached with the same reference numerals. In the present embodiment also, the functional block of the mobile state is the same as that of FIG. 1. In the present example, though whether or not the number of measured errors by step S1 exceeds a certain threshold value X is detected (step S21), this threshold value X is taken as a value still larger (an extremely great many number of errors which occur when entering the shadow of a building and the like are preferably detected) than X=100 of step S2 in the flow of FIG. 2, and regardless of whether the number of errors exceeds X or not, the number of errors is compared to the next threshold value, for example, 100 (same as X of step S2 of the flow of FIG. 2) (steps S22 and S24).

In step S22, when the number of errors exceeds the threshold value 100, the number of errors are controlled to the upper limit Xn with the number of occurred errors replaced by Xn (steps S23), and the operation proceeds to the variable control 30. Further, at step 22, when the number of errors is below the threshold value 100, the operation proceeds to the variable control 30. Although the variable control in this case is the variable control 30 shown in FIG. 2 or 4, step S10 is omitted. Even by this, the same advantage as the previous embodiment can be obtained.

Even when the number of errors is below X ("N" at step S21), whether it is large or small compared to the threshold value 100 is determined (step S24), and when it is 100 or less, the operation proceeds directly to the ordinary control 20, and when it exceeds 100 by suppressing the number of errors to Xn, the number of occurred errors is replaced by Xn (step S25), and the operation proceeds to the ordinary control 20. By this, from among a great many errors occurred in the short term, though not so much like the errors occurred by the shadow of a building and the like, the influence of the short term errors such as those inflecting harms on the quality of the moving average more or less can be suppressed even by the ordinary control 20.

Figure 6:
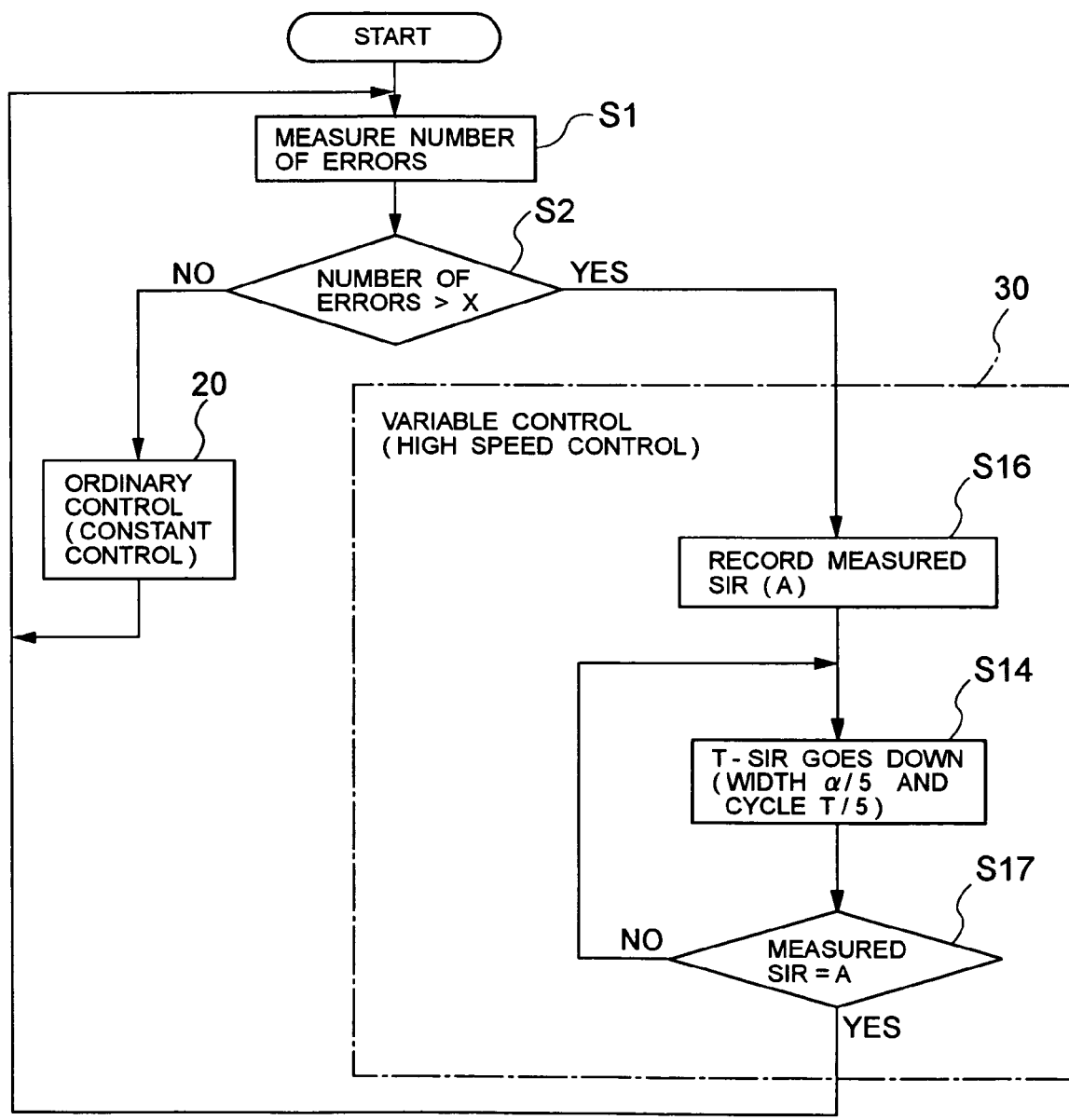
FIG. 6 is a flowchart showing the operation in a different embodiment of the present invention.

FIG. 6 is an operational flowchart showing another embodiment of the present invention, and the same parts as those of FIGS. 2 and 4 are shown by the same reference numerals. In the present example, steps S10 (processing of suppressing the number of errors to the upper limit), S11 and S12 (reception quality calculation and reception quality determining processing), S13 (processing of up-controlling the T-SIR), and S18 (the number of errors measuring processing) in the embodiment shown in FIG. 4 are omitted. That is, when the number of errors exceeds X, the measured SIR (A) at that time is recorded (step S16), and a high-speed going down control of the T-SIR is performed (step S14), and this high-speed going down control is repeated until the measured SIR reaches A. Even by this example, the same operational advantage as that of each of the above described embodiment can be obtained.

It will be appreciated that each of the above described embodiment can be similarly applied not only to the mobile communication terminal which is the mobile station, but also to the radio base station, and can be widely applied to the radio station of the mobile communication system. Needless to mention, each operational flow of FIGS. 2, 4, 5, and 6 is stored in advance in a recording medium as a program, and can be read and executed by a computer (CPU).

A first advantage according to the present invention is that a period in which an excessive transmission power is demanded from the distant radio communication station can be reduced. The reason why is because, by the number of occurrences of the errors of received signals, the going down change of the target SIR during the moving average processing is allowed to be controlled at high speed.

A second advantage according to the present invention is that the average transmission power of the distant station can be reduced, and moreover, the targeted reception quality can be achieved. The reason why is because, without reducing the moving average section length, the going down timing of the target SIR is quickened (by performing high speed control), so that the transmission power of the distant station is allowed to be adjusted.

A third advantage according to the present invention is that the convergence of the target SIR can be quickened. The reason why is because the going down timing of the target SIR is quickened, and at the same time, the reception SIR in which an error occurs is stored, and the target SIR is adjusted to this stored SIR at high speed by quickening the timing.

What is claimed is:

1. A transmission power target value control system, allowing a target value for a transmission power control to be down-controlled in a radio communication line between radio communication stations at a predetermined cycle and at a predetermined width when a reception quality of a moving average becomes better than a predetermined reception quality, said transmission power target value control system comprising:

a control means for controlling at least a down cycle of said target value to be shorter than said predetermined cycle when the number of error occurrences of received signals is larger than a predetermined threshold value; and a measuring means for measuring a reception SIR (signal to interference ratio), wherein a target SIR is calculated utilizing said moving average prior to the convergence of said predetermined reception quality and target value, and wherein said control means comprises means for calculating the reception quality by said moving average with replacing said number of error occurrences by a predetermined upper limit value smaller than said predetermined threshold value, and means for performing a down control of said target value when this calculated reception quality is better than said predetermined reception quality.

2. The transmission power target value control system according to claim 1, wherein said control means controls the down width of said target value smaller than said predetermined width when the number of error occurrences of received signals is larger than said predetermined threshold value.

3. The transmission power target value control system according to claim 1, further comprising a storage means for storing the reception SIR when the number of error occurrences of received signals becomes larger than said predetermined threshold value, wherein said control means performs the down control of said target value until a measured SIR by said measuring means reaches a stored SIR in said storage means.

4. The transmission power target value control system according to claim 1, wherein said upper limit value is decided by the number of said moving average sections and the value of said predetermined reception quality.

5. A mobile communication system, including the transmission power target value control system according to claim 1.

6. A transmission power target value control method, allowing a target value for a transmission power control to be down-controlled in a radio communication line between radio communication stations at a predetermined cycle and at a predetermined width when the reception quality of a moving average is better than a predetermined reception quality, said transmission power target value control method comprising:

a control step of controlling at least a down cycle of said target value to be shorter than said predetermined cycle when the number of error occurrences of received signals is larger than a predetermined threshold value; and a measuring means for measuring a reception SIR (signal to interference ratio), wherein a target SIR is calculated utilizing said moving average prior to the convergence of said predetermined reception quality and target value and wherein said control step comprises a step of calculating the reception quality by said moving average with replacing said number of error occurrences by a predetermined upper limit value smaller than said predetermined threshold value, and a step of performing a down control of said target value when this calculated reception quality is better than said predetermined reception quality.

7. The transmission power target value control method according to claim 6, wherein said control step controls the down width of said target value smaller than said predetermined width when the number of occurrences of received signals is larger than said predetermined threshold value.

8. The transmission power target value control method according to claim 6, further comprising a storing step of storing the reception SIR in a storing means when the number of error occurrences of received signals becomes larger than said predetermined threshold value, wherein the down control of said target value is continued until the measured SIR by said measuring step reaches the stored SIR in said storing means.

9. The transmission power target value control method according to claim 6 wherein said upper limit value is decided by the number of said moving average sections and the value of said predetermined reception quality.

10. A base station, allowing a target value for a transmission power control to be down-controlled in a radio communication line between radio communication stations at a predetermined cycle and at a predetermined width when the reception quality of a moving average is better than a predetermined reception quality, said base station comprises:

a control means for controlling at least a down cycle of said target value to be shorter than said predetermined cycle when the number of error occurrences of received signals is larger than a predetermined threshold value; and a measuring means for measuring a reception SIR (signal to interference ratio), wherein a target SIR is calculated utilizing said moving average prior to the convergence of said predetermined reception quality and target value, and wherein said control means comprises means for calculating the reception quality by said moving average with replacing said number of error occurrences by a predetermined upper limit value smaller than said predetermined threshold value, and means for performing a down control of said target value when this calculated reception quality is better than said predetermined reception quality.

11. The base station according to claim 10, wherein said control means controls the down width of said target value smaller than said predetermined width when the number of error occurrences of received signals is larger than said predetermined threshold value.

12. The base station according to claim 10, further comprising:

a storage means for storing the reception SIR when the number of error occurrences of received signals becomes larger than said predetermined threshold value, wherein said control means performs the down control of said target value until a measured SIR by said measuring means reaches a stored SIR in said storage means.

13. The base station according to claim 10, wherein said upper limit value is decided by the number of said moving average sections and the value of said predetermined reception quality.

14. A mobile communication terminal, allowing a target value for a transmission power control to be down-controlled in a radio communication line between radio communication stations at a predetermined cycle and at a predetermined width when a reception quality of a moving average becomes better than a predetermined reception quality, said mobile communication terminal comprises:

a control means for controlling at least a down cycle of said target value to be shorter than said predetermined cycle when the number of error occurrences is larger than a predetermined threshold value; and a measuring means for measuring a reception SIR (signal to interference ratio), wherein a target SIR is calculated utilizing said moving average prior to the convergence of said predetermined reception quality and target value, and wherein said control means comprises means for calculating the reception quality by said moving average with replacing said number of error occurrences by a predetermined upper limit value smaller than said predetermined threshold value, and means for performing a down control of said target value when this calculated reception quality is better than said predetermined reception quality.

15. The mobile communication terminal according to claim 14, wherein said control means controls the down width of said target value smaller than said predetermined width when the number of error occurrences of received signals is larger than said predetermined threshold value.

16. The mobile communication terminal according to claim 14, further comprising: a storage means for storing the reception SIR. when the number of error occurrences of received signals becomes larger than said predetermined threshold value, wherein said control means performs the down control of said target value until a measured SIR by said measuring means reaches a stored SIR in said storage means.

17. The mobile communication terminal according to claim 14, wherein said upper limit value is decided by the number of said moving average sections and the value of said predetermined reception quality.

18. A program readable by a computer, allowing a computer to execute a transmission power target value control method which allows a target value for a transmission power control to be down-controlled in a radio communication line between radio communication stations at a predetermined cycle and at a predetermined width when a reception quality of a moving average becomes better than a predetermined reception quality, said program comprises:

a control process of controlling at least a down cycle of said target value to be shorter than said predetermined cycle when the number of error occurrences of received signals is larger than a predetermined threshold value; and a measuring process of measuring a reception SIR (signal to interference ratio), wherein a target SIR is calculated utilizing said moving average prior to the convergence of said predetermined reception quality and target value, and wherein said control process comprises a process for calculating the reception quality by said moving average with replacing said number of error occurrences by an predetermined upper limit value smaller than said predetermined threshold value, and a process for performing a down control of said target value when this calculated reception quality is better than said predetermined reception quality.

19. The transmission power target value control system according to claim 1, further comprising a target BLER (block error ratio) value storage means, wherein said target BLER value storage means stores a plurality of target BLER values which are designated in advance representing a call type.

* * * * *